United States Patent
Uno et al.

(10) Patent No.: US 7,636,185 B2
(45) Date of Patent: Dec. 22, 2009

(54) HOLOGRAM RECORDING DEVICE AND HOLOGRAM RECORDING METHOD

(75) Inventors: Kazushi Uno, Kawasaki (JP); Kouichi Tezuka, Kawasaki (JP); Hiroyasu Yoshikawa, Kawasaki (JP); Yasumasa Iwamura, Kawasaki (JP); Yuzuru Yamakage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/270,614

(22) Filed: Nov. 13, 2008

(65) Prior Publication Data

US 2009/0122374 A1  May 14, 2009

Related U.S. Application Data

(63) Continuation of application No. PCT/JP2006/309697, filed on May 16, 2006.

(51) Int. Cl.
  *G03H 1/28* (2006.01)
  *G11B 7/00* (2006.01)
(52) U.S. Cl. .......................... 359/24; 369/103
(58) Field of Classification Search ............ 359/22, 359/24, 35; 369/103
See application file for complete search history.

(56) References Cited

U.S. PATENT DOCUMENTS 6,088,321 A * 7/2000 Yamaji et al. ............ 369/103
6,256,281 B1 * 7/2001 Tanaka et al. ............ 369/103
7,295,356 B2 11/2007 King
2004/0246556 A1 * 12/2004 Tsukagoshi ............ 359/238

FOREIGN PATENT DOCUMENTS

JP   A 2003-43904   2/2003

* cited by examiner

*Primary Examiner*—Alessandro Amari
(74) *Attorney, Agent, or Firm*—Greer, Burns & Crain, Ltd.

(57) ABSTRACT

A hologram recorder records a hologram in a hologram recording medium by interference of a recording beam irradiated at a predetermined incident angle to the medium via a spatial light modulator incliningly in a predetermined direction with a reference beam irradiated incliningly in an opposite direction to the recording beam so that the beams crosses at a predetermined crossing angle. The recorder includes a beam modulator for converting a Gaussian-beam having a Gaussian-distribution of intensity into a parallel beam having an intensity distribution tending to be uniform and allowing the parallel beam to travel to the spatial modulator as the recording beam. The Gaussian-beam has a center axis decentered from an optical axis of the beam modulator in a decentering direction including a directional component of the predetermined direction in which the recording beam is inclined or an opposite directional component thereto.

5 Claims, 8 Drawing Sheets

FIG.3

| | AB-Direction Incident Angle (deg) | CD-Direction Incident Angle (deg) | Surface Incident Angle $\theta s$ (deg) | Intra-Layer Incident Angle $\theta i$ (deg) | Irradiation Area Rate |
|---|---|---|---|---|---|
| Light Flux A | 58.3 ($\theta + \alpha$) | 0 | 58.3 | 34.93 | 1.864 |
| Light Flux B | 11.7 ($\theta - \alpha$) | 0 | 11.7 | 7.84 | 1 |
| Light Flux C | 35.0 | 23.3 | 41.21 | 26.32 | 1.302 |
| Light Flux D | 35.0 | -23.3 | 41.21 | 26.32 | 1.302 |

(a)

Decentering Amount m:0.1mm (b)

Decentering Amount m:0.12mm
A:B:C:D=1.5:1:1.22:1.22

(c)

Decentering Amount m:0.19mm
A:B:C:D=1.9:1:1.3:1.3

Half-Value Width Decreased by 15%
Decentering Amount m:0.12mm

HOLOGRAM RECORDING DEVICE AND HOLOGRAM RECORDING METHOD

This application is a Continuation of International Application No. PCT/JP2006/309697, filed May 16, 2006.

TECHNICAL FIELD

The present invention relates to a hologram recorder and a hologram recording method for recording holograms by means of interference between a recording beam and a reference beam.

BACKGROUND ART

A conventional hologram recording method is disclosed in Patent Document 1. In the method disclosed therein, a reference beam (baseline beam) is applied to a hologram recording medium from a predetermined oblique direction at the incident angle of 35 degrees whereas a recording beam (object beam) is applied from an opposite oblique direction with respect to the direction in which the reference beam is made oblique, at about 90 degrees. The reference beam has a beam intensity modulated by e.g. an ND (Neutral Density) filter. Specifically, in the conventional hologram recording method, since the recording beam is applied obliquely to the hologram recording medium, apodization is employed for uniformalizing the beam intensity distribution of the Gaussian-beam as the reference beam on the Fourier plane, whereby SN ratio is improved.

Patent Document 1: JP-A-2003-43904

However, in the beam intensity uniformalization by apodization, the beam transmissivity is reduced partially, which results in a large light loss and this low light utilization efficiency has been a disadvantage in comparison with the cases where apodization is not employed.

DISCLOSURE OF THE INVENTION

The present invention has been proposed under the above-described circumstances. An object of the present invention is to provide a hologram recorder and a hologram recording method for hologram recording capabilities without reduction in the light utilization efficiency.

In order to solve the above-described object, the present invention makes use of the following technical means.

According to a first aspect of the present invention, there is provided a hologram recorder for recording a hologram in a hologram recording medium by interference of a recording beam with a reference beam, the recording beam being irradiated at a predetermined incident angle to the hologram recording medium via a spatial light modulator in a state that the recording beam is inclined in a predetermined direction, the reference beam being irradiated in a state that the reference beam is inclined in an opposite direction to the recording beam so that the reference beam crosses with the recording beam at a predetermined crossing angle, the hologram recorder comprising a beam modulator for converting a Gaussian-beam having an intensity distribution of a Gaussian-distribution into a parallel beam having an intensity distribution tending to be uniform and allowing the parallel beam to travel to the spatial light modulator as the recording beam, wherein the Gaussian-beam has a center axis decentered from an optical axis of the beam modulator in a decentering direction including a directional component of the predetermined direction in which the recording beam is inclined or an opposite directional component to the predetermined direction.

Preferably, an amount of decentering of the Gaussian-beam is selected in accordance with a cosine law of illumination for the recording beam irradiated to the hologram recording media.

Preferably, the amount of decentering of the Gaussian-beam is selected in accordance with the polarization direction of the recording beam with respect to the hologram recording medium as an additional factor.

Preferably, the amount of decentering of the Gaussian-beam is selected in accordance with a diffraction efficiency of the recording beam and the reference beam with respect to the hologram recording medium as an additional factor. According to a second aspect of the present invention, there is provided a hologram recording method for recording a hologram in a hologram recording medium by interference of a recording beam with a reference beam, the recording beam being irradiated at a predetermined incident angle to the hologram recording medium via a beam modulator and a spatial light modulator in a state that the recording beam is inclined in a predetermined direction, the reference beam being irradiated in a state that the reference beam is inclined in an opposite direction to the recording beam so that the reference beam crosses with the recording beam at a predetermined crossing angle, the method comprising the steps of converting a Gaussian-beam having an intensity distribution tending to be uniform an intensity distribution of a Gaussian-distribution into a parallel beam having an intensity distribution tending to be uniform, and allowing the parallel beam to travel from the beam modulator to the spatial light modulator as the recording beam, wherein the center axis of the Gaussian-beam is decentered from an optical axis of the beam modulator in a decentering direction including a directional component of the predetermined direction in which the recording beam is inclined or an opposite directional component to the predetermined direction.

BRIEF DESCRIPTION OF THE DRAWINGS

FIG. 3 is an explanatory diagram for describing an optical function of the hologram recorder in FIG. 1.

BEST MODE FOR CARRYING OUT THE INVENTION

Preferred embodiments of the present invention will be described below with reference to the drawings.

Figure 1:
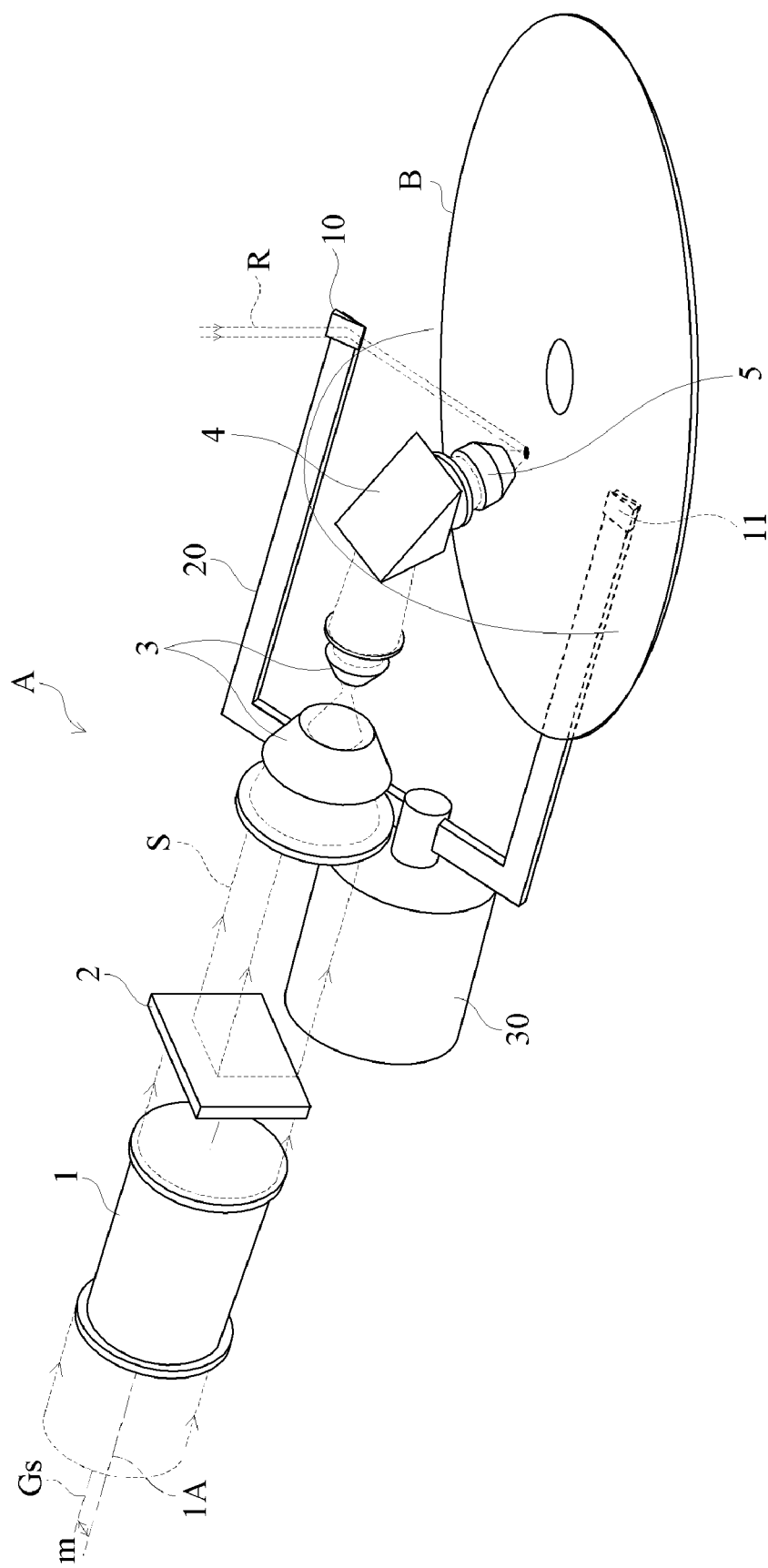
FIG. 1 is a perspective view showing an embodiment of a hologram recorder according to the present invention.

As shown in FIG. 1, a hologram recorder A according to the present embodiment serves to record holograms to a disc-like hologram recording medium B by means of interference between a recording beam S and a reference beam R; the recording beam S is applied to the hologram recording medium B from a predetermined oblique direction whereas the reference beam R is applied from an opposite oblique direction from that of the recording beam S. The hologram recorder is designed to record multiple holograms using angular multiplex method by variable controlling of the incident angle of the reference beam R.

The hologram recorder A includes a recording-beam optical system for application of the recording beam S to a recording area of the hologram recording medium B at a constant incident angle θ (see FIG. 2), and a reference-beam optical system for application of the reference beam R to the recording area obliquely under a variable control on the incident angle. Though not illustrated, there are other components such as a light source which generates a laser beam, a beam splitter for splitting the laser beam into the recording beam S and the reference beam R, a collimator lens which converts the laser beam into a parallel beams, and so on. The recording-beam optical system includes a beam homogenizer (beam modulating means) 1, a spatial light modulator 2, a zoom lens 3, a beam splitter 4 and a recording-beam objective lens 5. The reference-beam optical system includes a recording mirror 10, a reproduction mirror 11, a U-shaped arm member 20, and a drive motor 30. The recording mirror 10 and the reproduction mirror 11 are fixed to respective tips of the arm member 20. The arm member 20 is pivoted by the drive motor 30 about a pivotal axis which lies radially of the hologram recording medium B. The recording-beam optical system and the reference-beam optical system are mounted on a moving head (not illustrated) which is reciprocable in a radial direction of the hologram recording medium B.

Figure 2:
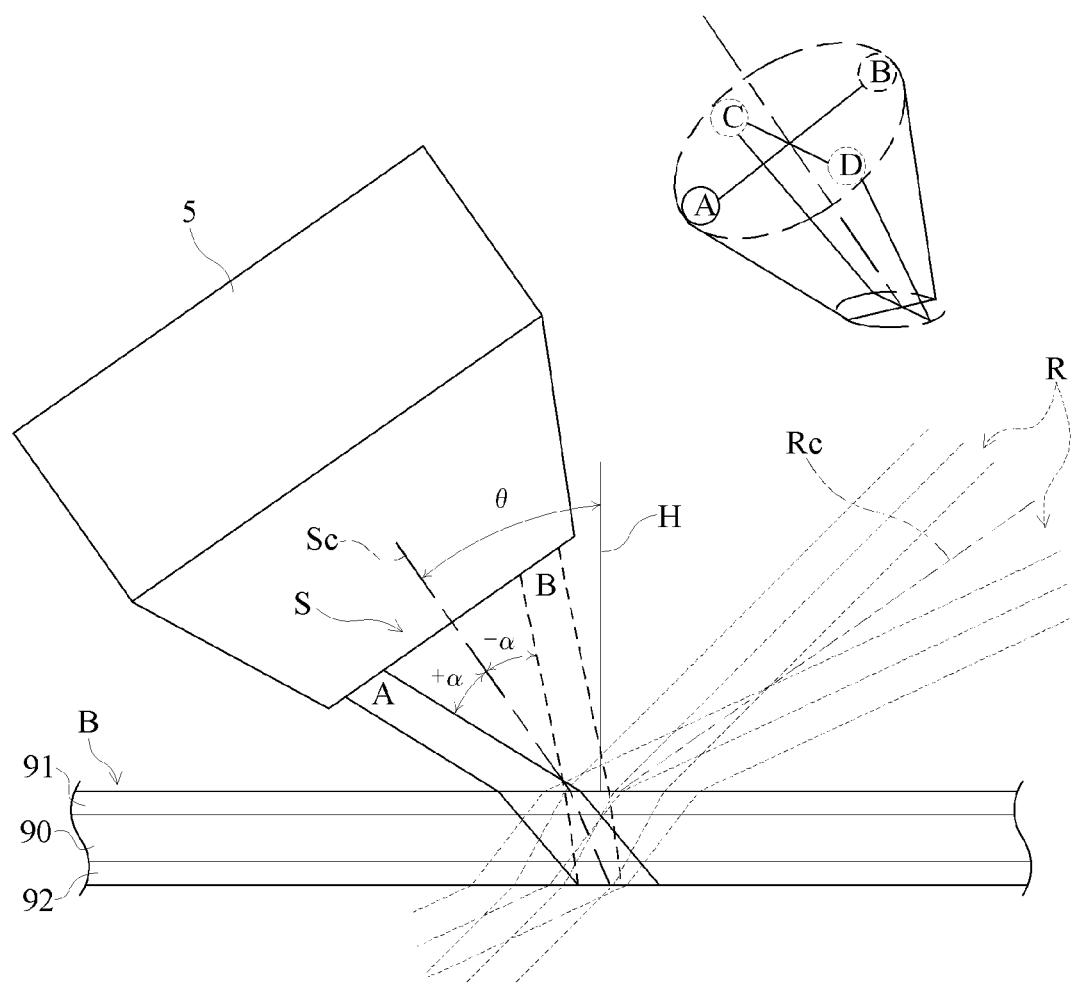
FIG. 2 is an explanatory diagram for describing a geometric optical characteristic of the hologram recorder in FIG. 1.

As shown in FIG. 2, the hologram recording medium B has a recording layer 90 provided by a photo polymer as an intermediate layer. The recording layer 90 is sandwiched by transparent cover layers 91, 92. In the present embodiment, the recording layer 90 has a thickness of about 1 mm, and the cover layers 91, 92 have a thickness of about 0.5 mm. When recording is performed, the recording beam S and the reference beam R are applied from above the hologram recording medium B. When reproducing is performed, only the reference beam R is applied from below the hologram recording medium B.

The laser beam which comes from the unillustrated light source is a Gaussian-beam which has a light intensity distribution following a Gaussian distribution. This Gaussian-beam is then converted into a parallel beam by the unillustrated collimator lens, and then split by the beam splitter into a recording beam S and a reference beam R. The recording beam S enters the beam homogenizer 1 as a Gaussian-beam. On the other hand, the reference beam R is directed to the recording mirror 10 or to the reproduction mirror 11. It should be noted here that the laser beam (Gaussian-beam) from the light source may first pass the collimator lens and the beam homogenizer before it is split by the beam splitter into a recording beam and a reference beam.

The beam homogenizer 1 is provided by an aspheric lens, converts the incoming Gaussian-beam into a parallel beam which has an intensity distribution tendency toward uniformity, and directs this parallel beam to the spatial light modulator 2 as a recording beam S. The center axis Gs of the incoming Gaussian-beam is decentered from the optical axis 1A of the beam homogenizer 1 by a predetermined decentering amount m in a direction away from the direction in which the recording beam S is slanted with respect to the hologram recording medium B. According to the beam homogenizer 1, it is possible to convert a Gaussian-beam into a beam having uniform intensity distribution with little light loss. It should be noted here that the beam homogenizer 1 in the present embodiment is a non-flipping type which allows the incoming beam to be emitted without inversion around the optical axis; however, a flipping type beam homogenizer may be used which inverses the incoming beam around the optical axis.

The spatial light modulator 2 is provided by e.g. a transmissive liquid crystal device, and modulates the incoming recording beam S into a beam which has a two-dimensional pixel pattern according to the information to be recorded. The recording beam S from the spatial light modulator 2 passes through the zoom lens 3 to be guided to the beam splitter 4 and the recording-beam objective lens 5, and is finally applied to the hologram recording medium B at a predetermined entering angle θ. In this process, the zoom lens 3 flips the recording beam SF around the optical axis by 180 degrees. For this reason, the decentering direction of the Gaussian-beam with respect to the optical axis 1A of the beam homogenizer 1 is opposite to the direction in which the recording beam S is slanted with respect to the hologram recording medium B, as described above. It should be noted here that if the optical system is configured in such a way that the recording beam is not inverted and guided to the hologram recording media, the decentering direction of the Gaussian-beam with respect to the optical axis of the beam homogenizer is the same as the direction in which the recording beam is slanted with respect to the hologram recording media. Such an optical system as the above may be provided, for example, by a combination of a flip-type beam homogenizer and a zoom lens.

The recording mirror 10 and the reproduction mirror 11 are provided by galvano-mirrors, for example. The recording mirror 10 is fixed to a tip of the arm member 20 which is pivotable above the hologram recording medium B. The recording mirror 10 reflects the reference beam R which comes from above into an obliquely downward direction toward the recording area of the hologram recording medium B for recording. The reproduction mirror 11 is fixed to a tip of the arm member 20 which is pivotable below the hologram recording medium B. The reproduction mirror 11 reflects the reference beam R which comes from the side into an obliquely upward direction (not illustrated) toward the recording area of the hologram recording medium B for reproducing. According to the recording and the reproduction mirrors 10, 11 which are provided by galvano-mirrors, it is possible to make fine adjustment on the incident angle of the reference beam R at the recording area.

As shown in FIG. 2, at the time of recording for example, the incident angle of the reference beam R changes about an axis Rc in association with the pivoting operation of the arm member 20. The axis Rc is set to make an angle (crossing angle) of about 90 degrees with a center axis Sc of the recording beam S. The recording beam S is converged by the objective lens 5 and is applied so as to overlap with the reference beam R at the recording area. The objective lens 5 is disposed obliquely to the hologram recording medium B so that the recording beam S is applied from a predetermined oblique direction. For this reason, it is possible to vary the incident angle of the reference beam R over a wide range without being blocked by the objective lens 5. This allows finer variable control on the incident angle of the reference beam R for higher level of multiplicity, making it easy to increase the hologram multiplicity. Though not depicted specifically in the illustration, note that both the recording beam S and the reference beam R are polarized in the direction perpendicular to the surface of the paper. Thus, a hologram is recorded in the recording layer 90 of the hologram recording medium B by interference between the recording beam S and the reference beam R, and holograms of different interference patterns are recorded in multiplex recording as the incident angle of the reference beam R is varied.

Next, an optical function of the hologram recorder A will be described.

First, if the decentering amount m is zero, i.e., if the Gaussian-beam's center axis Gs is aligned with the optical axis 1A of the beam homogenizer 1, a resulting hologram in the recording area has non-uniform contrast caused by the following three factors:

Specifically, the first factor is the cosine law of illumination, based on the fact that since the recording beam S is oblique to the recording layer 90, there is a significant difference in respective irradiation areas produced by light flux A and light flux B of the recording beam S. As shown in FIG. 2, light flux A is a more oblique recording beam S whose incident angle is greater than the center axis Sc by +α whereas light flux B is a less oblique recording beam S with the incident angle smaller than the center axis Sc by −α. For this reason, light flux A's irradiation area is larger than light flux B's irradiation area. As shown in a pictorial representation on the upper right portion in FIG. 2, there are light flux C and light flux D of the recording beam S in a direction (Direction CD) perpendicular to the direction (Direction AB) connecting light flux A and light flux B. The cosine law of illumination also works on these light flux C and light flux D. The respective irradiation areas of the light flux C and light flux D are also slightly larger than that of light flux B. The increase in irradiation area results in decrease in light intensity.

For example, when it is assumed that the center axis Sc of the recording beam S has an incident angle θ of 35 degrees and α is 23.3 degrees, light flux A through light flux D have geometric optical characteristics as shown in FIG. 3.

The AB-direction incident angle in FIG. 3 is an incident angle which is formed in the AB direction from the normal H of the hologram recording medium B whereas the CD-direction incident angle is an incident angle which is formed in the CD direction from the normal H of the hologram recording medium B. Surface incident angle θs represents the substantial incident angle to the hologram recording medium B whereas intra-layer incident angle θi represents the substantial incident angle inside the recording layer 90. The intra-layer entering angle θi is given by Snell's law ($n_0 \sin θs = n_1 \sin θi$), where $n_0$ represents the refraction index of an external medium (normally the air, and for the air $n_0=1$) of the hologram recording medium B, and $n_1$ represents the refraction index of the recording layer 90 and the cover layers 91, 92 (in the present embodiment $n_1=1.486$).

Irradiation area rate shown in FIG. 3 is rate relative to the light flux B irradiation area as being 1. With all of light flux A through light flux D having the same area of section as being 1 before illuminating the hologram recording medium B, the substantial irradiation area of light flux A through light flux D on the surface of the hologram recording medium B is given as 1/cos θs using the surface incident angle θs. Based on these substantial irradiation area values for light flux A through light flux D, irradiation area rates can be obtained as shown in FIG. 3 assuming light flux B irradiation area being 1. Therefore, in consideration of the first factor, it is preferable that the recording beam S should have an intensity distribution which follows the proportion in the irradiation area rates of light flux A through light flux D, i.e., A:B:C:D=1.864:1:1.302:1.302, in order to achieve a uniform intensity distribution. It should be noted here that the first factor based on the cosine law of illumination is the primary factor which must be dealt with in order to achieve a uniform intensity distribution, and determining on the intensity distribution based on the cosine law of illumination will result in substantial uniformity in the intensity distribution of the recording beam S. The second and the third factors to be described next are only additional factors for intensity distribution uniformalization of the recording beam S.

The second factor relates to relative differences in the polarization direction of the recording beam S and the reference beam R. Referring to FIG. 2, each of the polarization directions of light flux A and light flux B is perpendicular to the paper. Since the polarization direction of the reference beam R is also perpendicular to the paper, there is no differences between these polarization directions, and so the beam interference is not weakened. On the other hand, each of the polarization directions of light flux C and light flux D is tilted in the CD direction due to the CD-direction incident angle. For this reason, there is a difference between the polarization directions of the reference beam R and light flux C or light flux D.

Figure 4:
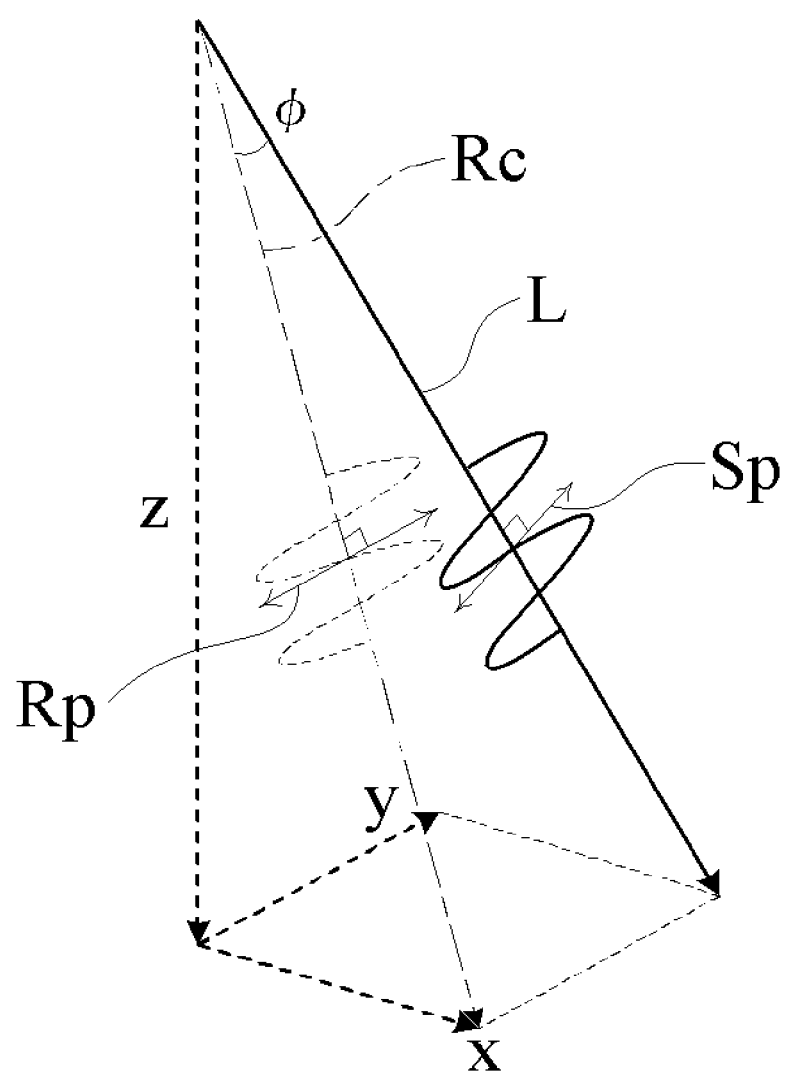
FIG. 4 is an explanatory diagram for describing an optical function of the hologram recorder in FIG. 1.

Specifically, considering the polarization directions inside the recording layer 90, the polarization directions can be represented by vectors as shown in FIG. 4. Note that in FIG. 4, the direction x, the direction y, and the direction z represent the direction AB, the direction CD, and the direction perpendicular to the hologram recording medium B, respectively. The reference beam R travels along the axis Rc, and the polarization direction Rp of the reference beam R is perpendicular to the axis Rc. On the other hand, light flux C, for example, travels along a tilted axis L which is deviated from the axis Rc by the angle φ. For this reason, the polarization direction Sp of light flux C is deviated from the polarization direction Rp of the reference beam R by the angle φ.

For example, in the case where φ=15.29 degrees, the electric field amplitude of light flux C which contributes to the interference with the reference beam R is represented by cos φ=0.9646 times. Same applies to the electric field amplitude of light flux D. In other words, taking the polarizing direction into consideration, the electric field amplitude of light flux C and light flux D must be increased by multiplication by an inverse number of cos φ, i.e., by a rate of 1.0367; and with this, the intensity distribution of light flux C and light flux D is uniformalized by multiplication by a squared number of the electric field amplitude, i.e., by a rate of 1.0747. Therefore, in consideration of the second factor, it is preferable that the recording beam S should have an intensity distribution of; A:B:C:D=1:1:1.0747:1.0747 with the intensity of light flux A and light flux B as being 1 in order to achieve a uniform intensity distribution.

As the third factor, diffraction efficiency of the recording beam S and the reference beam R must be considered. When it is assumed that θs is the surface incident angle of the reference beam R, θs is the surface incident angle of the recording beam S, d is the thickness of the recording layer 90, λ is wavelength of the recording beam S and the reference beam R, and Δn is refractive-index modulation per page, the diffraction efficiency η is given by the following equation:

$$\eta = \sin^2\left(\frac{\pi \cdot d \cdot \Delta n}{\lambda \sqrt{\cos θr \cdot \cos θs}}\right) \qquad \text{Equation 1}$$

Figure 5:
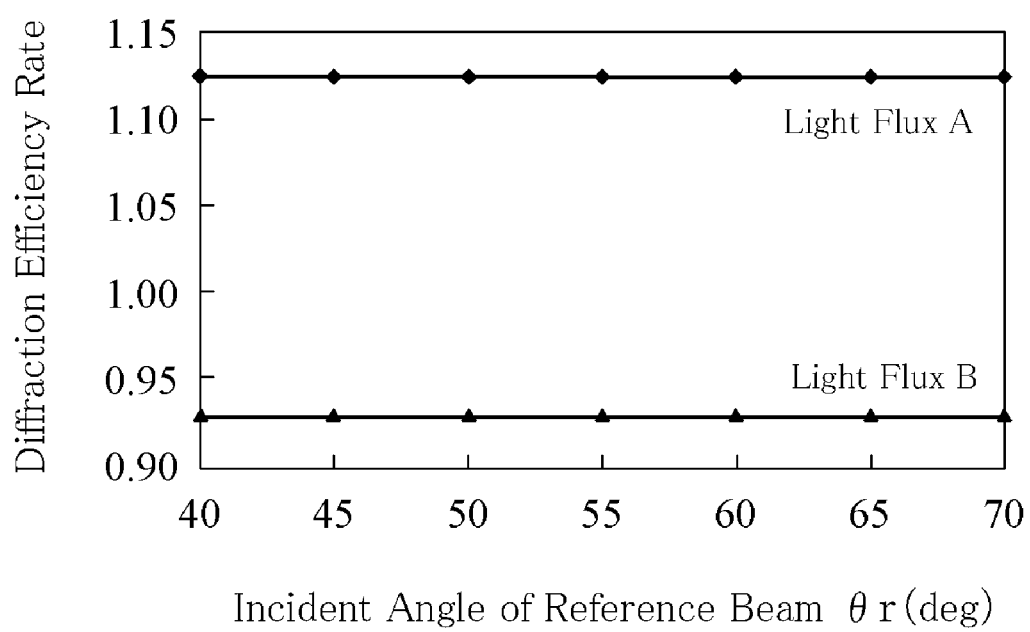
FIG. 5 is an explanatory diagram for describing an optical function of the hologram recorder in FIG. 1.

With light flux C's and light flux D's diffraction efficiency η being approximately 1, the diffraction efficiency rates of light flux A and light flux B are as shown in FIG. 5. Specifically, the diffraction efficiency of light flux A is 1.125 times as large as the diffraction efficiency of light flux C and light flux D whereas the diffraction efficiency of light flux B is 0.931 times as large as it. The refractive-index modulation Δn can be used as an index of a product of the electric field amplitude of the recording S and the electric field amplitude of the reference beam R. Thus, with an attention only to the recording beam S, it is necessary to increase the electric field amplitudes of the light flux A and light flux B by multiplication by a square root of an inverse number of the diffraction efficiency rate, i.e., by a rate of 0.9429 for light flux A and 1.0364 for light flux B. Therefore, in consideration of the third factor, it is preferable that with the electric field amplitude rate being squared and the intensity of light flux B being 1, the recording beam S should have an intensity distribution following: A:B:C:D=0.828:1:0.9308:0.9308, in order to achieve a uniform intensity distribution.

As a conclusion, all of the above-described first through third factors should be taken into consideration in a comprehensive manner, which means by multiplying all the rates for light flux A through light flux D, an optimum intensity distribution is obtained for the recording beam S when A:B:C:D=1.54:1:1.3:1.3.

Figure 6:
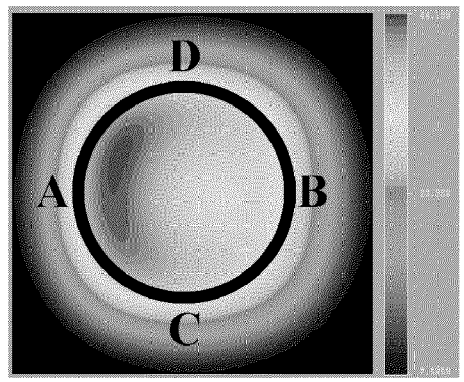
FIG. 6 shows light distribution patterns as a result of a simulation conducted with an optical system.
Figure 6:
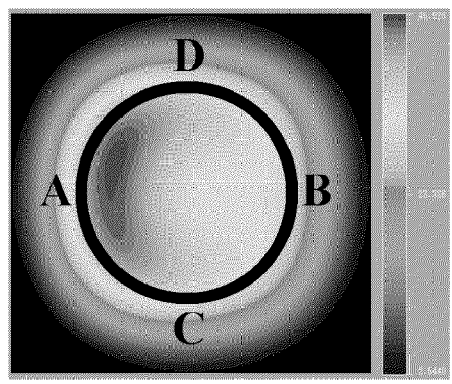
Figure 6:
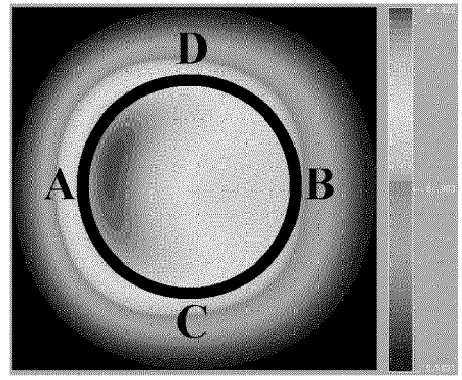

Based on the above-described points, a simulation was conducted to see how the intensity distribution of recording beam S would change when the decentering amount m of a Gaussian-beam was varied. FIG. 6(a) through FIG. 6(c) show a result of the simulation. As shown in FIG. 6(b), when the Gaussian-beam's decentering amount m was 0.12 mm, the intensity distribution rate of the recording beam S was closest to the ideal. Based on this, hologram recorder A uses a value of approximately 0.12 mm as the decentering amount m for the Gaussian-beam.

Figure 7:
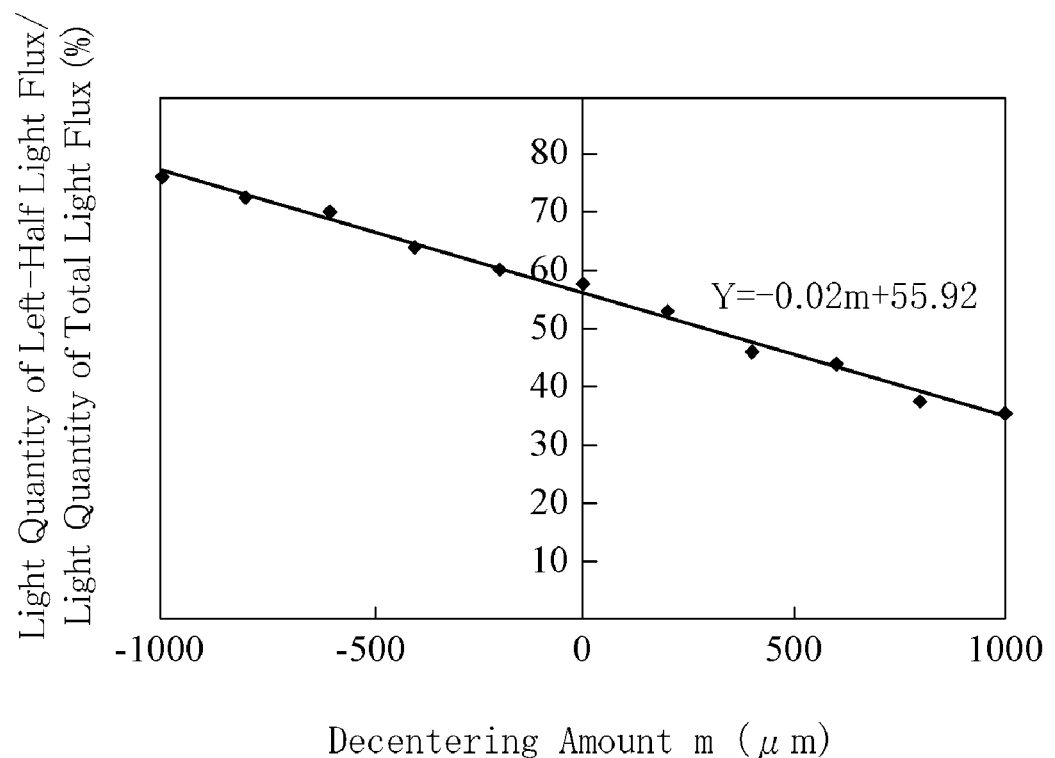
FIG. 7 shows a relationship between the decentering amount and the light intensity as a result of a simulation conducted with an optical system.
Figure 8:
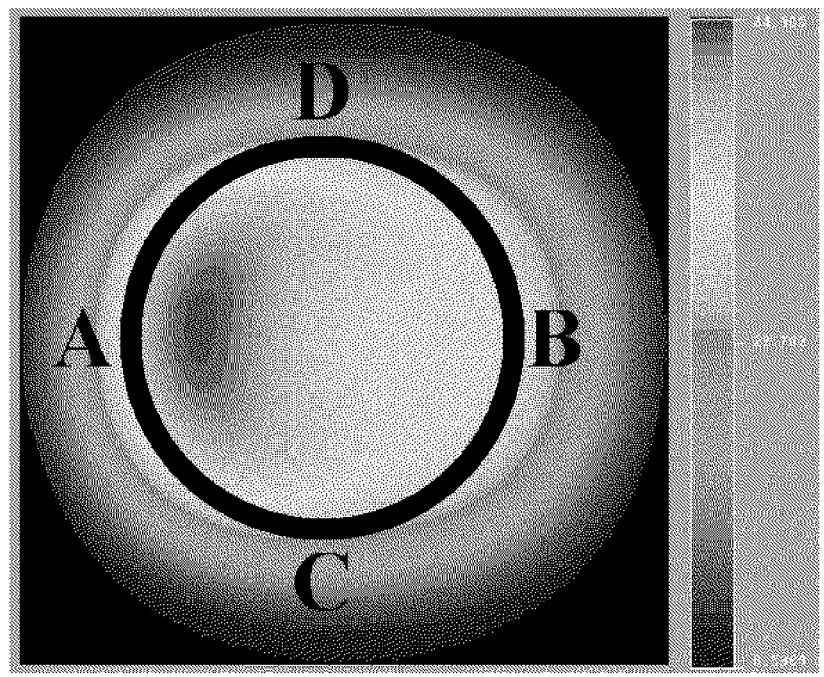
FIG. 8 shows a light distribution pattern as a result of a simulation conducted with an optical system.

As a reference, FIG. 7 shows a result of a simulation to search the rate of the light flux amount in the left half side including light flux A to the total light flux amount in the case where the decentering amount m of the Gaussian-beam is varied. FIG. 8 shows a result of a simulation of the case where a half-value width of the Gaussian-beam is reduced by about 15% using the beam homogenizer 1 with the decentering amount m being 0.12 mm. As shown in FIG. 7 and FIG. 8, it is also possible to achieve an intensity distribution of the recording beam S which has a substantially close intensity distribution rate to the ideal by beam size adjustment on the Gaussian-beam.

Thus, according to the hologram recorder A offered by the present embodiment, the Gaussian-beam which enters the beam homogenizer 1 should only be shifted in an appropriate direction and by an appropriate decentering amount m, and this makes possible to apply the recording beam S of a uniform intensity distribution to the hologram recording medium B with little reduction in the light utilization efficiency, and thereby to record a hologram as a uniform interference pattern.

It should be noted here that the present invention is not limited to the embodiment described above.

The incident angle θ (35 degrees) of the recording beam S, the decentering amount m (0.12 mm) of the Gaussian-beam and so on only represent example values, and the values may be varied appropriately in accordance with specific variations which are made.

It is preferable that the decentering direction of the Gaussian-beam should be as close as possible to the direction in which the recording beam is slanted, as well as to the opposite direction thereto; however, a certain discrepancy from these most desirable direction are acceptable.

The invention claimed is:

1. A hologram recorder for recording a hologram in a hologram recording medium by interference of a recording beam with a reference beam, the recording beam being irradiated at a predetermined incident angle to the hologram recording medium via a spatial light modulator in a state that the recording beam is inclined in a predetermined direction, the reference beam being irradiated in a state that the reference beam is inclined in an opposite direction to the recording beam so that the reference beam crosses with the recording beam at a predetermined crossing angle, the hologram recorder comprising:

a beam modulator for converting a Gaussian-beam having an intensity distribution of a Gaussian-distribution into a parallel beam having an intensity distribution tending to be uniform and allowing the parallel beam to travel to the spatial light modulator as the recording beam, wherein the Gaussian-beam has a center axis decentered from an optical axis of the beam modulator in a decentering direction including a directional component of the predetermined direction in which the recording beam is inclined or an opposite directional component to the predetermined direction.

2. The hologram recorder according to claim 1, wherein an amount of decentering of the Gaussian-beam is selected in accordance with a cosine law of illumination for the recording beam irradiated to the hologram recording media.

3. The hologram recorder according to claim 2, wherein the amount of decentering of the Gaussian-beam is selected in accordance with the polarization direction of the recording beam with respect to the hologram recording medium as an additional factor.

4. The hologram recorder according to claim 2, wherein the amount of decentering of the Gaussian-beam is selected in accordance with a diffraction efficiency of the recording beam and the reference beam with respect to the hologram recording medium as an additional factor.

5. A hologram recording method for recording a hologram in a hologram recording medium by interference of a recording beam with a reference beam, the recording beam being irradiated at a predetermined incident angle to the hologram recording medium via a beam modulator and a spatial light modulator in a state that the recording beam is inclined in a predetermined direction, the reference beam being irradiated in a state that the reference beam is inclined in an opposite direction to the recording beam so that the reference beam crosses with the recording beam at a predetermined crossing angle, the method comprising the steps of:

converting a Gaussian-beam having an intensity distribution of a Gaussian-distribution into a parallel beam having an intensity distribution tending to be uniform, and allowing the parallel beam to travel from the beam modulator to the spatial light modulator as the recording beam, wherein the center axis of the Gaussian-beam is decentered from an optical axis of the beam modulator in a decentering direction including a directional component of the predetermined direction in which the recording beam is inclined or an opposite directional component to the predetermined direction.

* * * * *